(12) United States Patent
Spielmann

(10) Patent No.: US 9,707,999 B2
(45) Date of Patent: Jul. 18, 2017

(54) STEERING UNIT

(71) Applicant: SAF-HOLLAND GmbH, Bessenbach (DE)

(72) Inventor: Rolf Spielmann, Wertheim-Bettingen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 14/902,780

(22) PCT Filed: Jul. 24, 2014

(86) PCT No.: PCT/EP2014/065895
§ 371 (c)(1),
(2) Date: Jan. 4, 2016

(87) PCT Pub. No.: WO2015/014702
PCT Pub. Date: Feb. 5, 2015

(65) Prior Publication Data
US 2016/0176439 A1   Jun. 23, 2016

(30) Foreign Application Priority Data

Jul. 29, 2013 (DE) .................. 10 2013 214 737

(51) Int. Cl.
*B62D 7/22* (2006.01)
*B60G 7/00* (2006.01)
(Continued)

(52) U.S. Cl.
CPC ............... *B62D 7/22* (2013.01); *B60G 7/001* (2013.01); *B60G 7/008* (2013.01); *B60G 7/02* (2013.01);
(Continued)

(58) Field of Classification Search
CPC .......... B60G 3/12; B60G 7/001; B60G 7/008; B60G 7/02; B60G 9/003; B60G 11/27;
(Continued)

(56) References Cited

U.S. PATENT DOCUMENTS

| 4,415,179 A | 11/1983 | Marinelli |
| 4,722,549 A * | 2/1988 | Raidel ............... B60G 11/27 |
| | | 280/124.116 |

(Continued)

FOREIGN PATENT DOCUMENTS

| DE | 29616257 | 12/1996 |
| DE | 29824897 | 5/2003 |

(Continued)

OTHER PUBLICATIONS

European Patent Office, International Search Report, Oct. 6, 2014.

*Primary Examiner* — Laura Freedman
(74) *Attorney, Agent, or Firm* — Price Heneveld LLP

(57) ABSTRACT

A steering unit includes a guide unit and a support unit having a second fastening section fixed to a first fastening section of the guide unit and a load-bearing section accommodating a spring unit, a second plane is oriented orthogonally with respect to a width of the second fastening section, the load-bearing section is asymmetrical with respect to the second plane, the guide unit extends predominantly along a first plane, wherein, in an assembled state, the first plane is oriented to the second plane, wherein the first plane is oriented orthogonally with respect to a pivot axis of a pivotable mounting of the guide unit in a bearing section, wherein, in a mounted state, at least one fastening structure is arranged in the first plane, and wherein the first plane runs centrally through the bearing section of the guide unit.

17 Claims, 8 Drawing Sheets

(51) Int. Cl.
*B60G 7/02* (2006.01)
*B60G 9/00* (2006.01)
*B60G 11/27* (2006.01)
*B60G 11/28* (2006.01)
*B60G 21/05* (2006.01)
*B60G 3/12* (2006.01)
*B62D 65/00* (2006.01)

(52) U.S. Cl.
CPC .............. *B60G 9/003* (2013.01); *B60G 11/27* (2013.01); *B60G 11/28* (2013.01); *B62D 65/00* (2013.01); *B60G 2200/31* (2013.01); *B60G 2202/152* (2013.01); *B60G 2204/126* (2013.01); *B60G 2204/143* (2013.01); *B60G 2204/148* (2013.01); *B60G 2204/43* (2013.01); *B60G 2204/4302* (2013.01); *B60G 2204/61* (2013.01); *B60G 2206/012* (2013.01); *B60G 2206/10* (2013.01); *B60G 2206/30* (2013.01); *B60G 2206/601* (2013.01); *B60G 2206/811* (2013.01); *B60G 2206/8107* (2013.01); *B60G 2206/8201* (2013.01); *B60G 2206/8207* (2013.01); *B60G 2206/82013* (2013.01)

(58) Field of Classification Search
CPC   B60G 11/28; B60G 21/051; B60G 2200/132; B60G 2200/1324; B60G 2200/31; B60G 2202/152; B60G 2204/126; B60G 2204/143; B60G 2204/148; B60G 2204/43; B60G 2204/4302; B60G 2204/61; B60G 2206/012; B60G 2206/10; B60G 2206/601; B62D 7/22
See application file for complete search history.

(56) References Cited

U.S. PATENT DOCUMENTS

| | | | |
|---|---|---|---|
| 5,039,124 A * | 8/1991 | Widmer | B60G 11/27 267/256 |
| 5,127,668 A | 7/1992 | Raidel | |
| 5,375,871 A | 12/1994 | Mitchell et al. | |
| 5,690,353 A * | 11/1997 | Vandenberg | B60G 7/001 280/124.116 |
| 5,954,351 A * | 9/1999 | Koschinat | B60G 9/003 280/124.116 |
| 6,508,482 B2 * | 1/2003 | Pierce | B60G 7/001 280/124.116 |
| 6,557,875 B2 * | 5/2003 | Schlosser | B60G 7/001 280/124.128 |
| 6,672,604 B2 * | 1/2004 | Eveley | B60G 9/02 280/124.128 |
| 6,834,874 B1 | 12/2004 | Overby | |
| 7,048,288 B2 * | 5/2006 | Chan | B60G 9/003 280/124.11 |
| 7,077,411 B2 * | 7/2006 | Peters | B60G 5/02 280/124.132 |
| 7,823,429 B2 * | 11/2010 | Drewes | B21D 26/033 72/55 |
| 8,469,379 B2 * | 6/2013 | Aalderink | B60G 7/008 280/124.116 |
| 8,490,989 B2 * | 7/2013 | Piehl | B60G 9/02 280/124.11 |
| 8,910,961 B2 * | 12/2014 | Galazin | B60G 9/003 280/124.128 |
| 8,998,229 B2 * | 4/2015 | Michel | B60G 5/06 280/124.116 |
| 2002/0135225 A1 | 9/2002 | Dantele | |
| 2005/0242541 A1 * | 11/2005 | Griffiths | B60G 9/003 280/124.11 |
| 2011/0095501 A1 | 4/2011 | Piehl et al. | |
| 2015/0054245 A1 * | 2/2015 | Drewes | B60G 9/003 280/124.111 |

FOREIGN PATENT DOCUMENTS

| | | |
|---|---|---|
| DE | 10231376 | 1/2004 |
| DE | 202008014426 | 5/2009 |
| DE | 102011086480 | 5/2013 |
| WO | 9742047 | 11/1997 |
| WO | 2007042123 | 4/2007 |
| WO | 2010095924 | 8/2010 |
| WO | 2011053570 | 5/2011 |
| WO | 2012135200 | 10/2012 |

\* cited by examiner

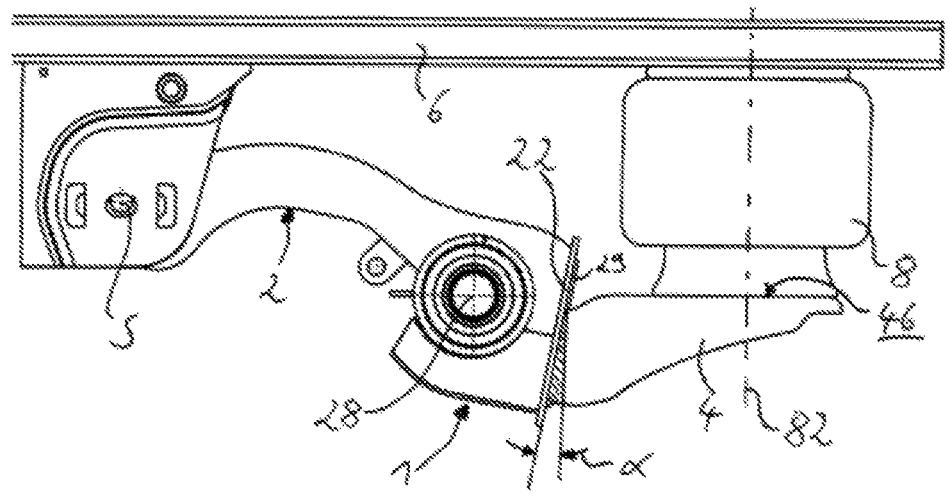
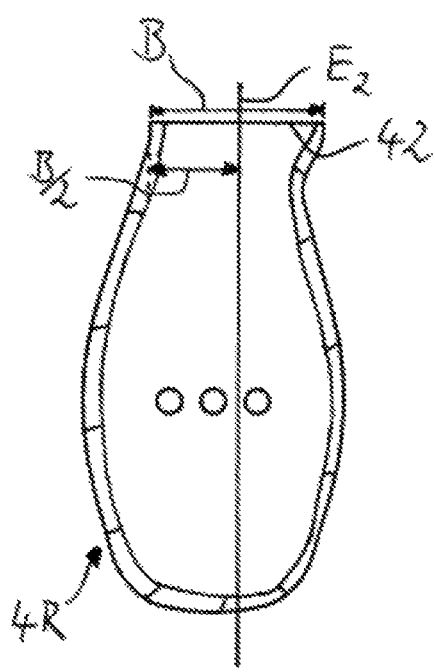
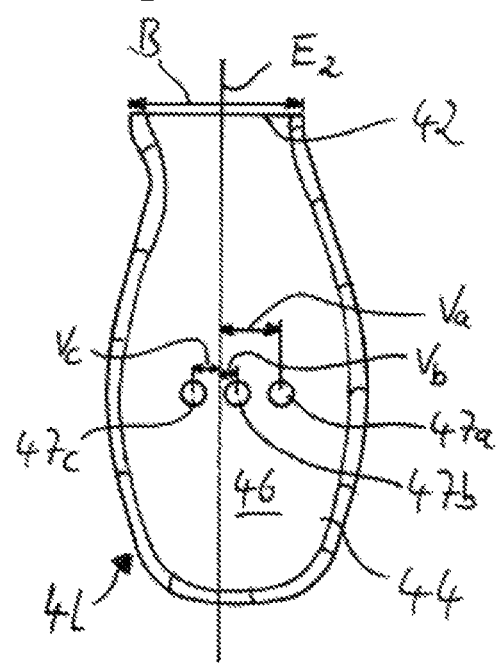

STEERING UNIT

BACKGROUND OF THE INVENTION

The present invention relates to a steering unit, in particular for utility vehicles, and to a chassis system for utility vehicles, and to a production method for producing a support unit.

Steering units are well known from the prior art and are particularly preferably used together with chassis with air suspension in utility vehicles. Here, a so-called longitudinal link, or a steering unit, serves for the sprung mounting of a suspension region for the wheels of the utility vehicle. For this purpose, the steering unit is normally suspended pivotably on the frame of the vehicle, for example on a bearing block, and has a bearing region for the fixing of a spring unit, for example an air spring. Here, the problem has arisen that, owing to different track widths, different frame geometries on different utility vehicle types and a multiplicity of possible air suspension geometries, a broad spectrum of geometries of steering units is required. To satisfy these requirements, it has hitherto been necessary to provide an almost unmanageable number of geometries for steering units. It has hitherto been attempted to counteract this problem by providing a multiplicity of fastening points in the air spring fastening region of the steering unit, of which in each case only one is then used for the fastening of the spring unit. Such steering units can be used in a certain number of chassis geometries. At the same time, this configuration however also results in overdimensioning of the steering unit, which has an adverse effect on the weight and the structural space requirement of the steering unit. There therefore remains a considerable demand for improving the versatility of steering units and for reducing the production costs through standardization of individual structural units, and for reducing the weight and the structural space required by the steering unit.

It is an object of the present invention to provide a steering unit which is versatile and which avoids overdimensioning of the weight and of the required structural space. Furthermore, it is an object of the present invention to provide a chassis system which, while avoiding the disadvantages of the prior art as mentioned in the introduction, is simple and inexpensive to produce. It is also an object of the present invention to specify a production method with which steering units can be produced in a simple manner.

SUMMARY OF THE INVENTION

According to the invention, the steering unit comprises a guide unit and a support unit, wherein the guide unit has a first fastening section at a first distal end, wherein the support unit has a second fastening section for fixing to the first fastening section and has a load-bearing section for accommodating a spring unit, wherein a second plane is oriented orthogonally with respect to a width of the second fastening section of the support unit, and wherein the load-bearing section is of asymmetrical form with respect to the second plane. The steering unit is composed of two main structural units, the guide unit and the support unit, wherein the two structural units can be produced and processed separately from one another before the assembly process, and are fixedly connected to one another in an assembled state, that is to say after the assembly of the steering unit. Here, both the guide unit and the support unit have a fastening section, which fastening sections preferably geometrically correspond to one another such that the support unit can be fixed to the guide unit with little outlay. This means, for example, that corresponding welding surfaces are provided which geometrically correspond to one another and which define a corresponding edge for the introduction of a weld seam. It would alternatively preferably also be possible for a corresponding screw-connection region to be provided, in which the support unit can be fixedly screwed to the guide unit. It is furthermore preferable for projections or recesses to preferably be provided on the corresponding fastening surfaces of the support unit and of the guide unit, which projections or recesses can engage into one another in positively locking fashion and thus permit easier locating of the support unit on the guide unit. It is preferable for two elongate projections to be provided on the guide unit, which projections can be placed in positively locking engagement with two, likewise elongate recesses provided on the support unit. The support unit is particularly preferably the fastening region for a spring unit, preferably an air spring of a utility vehicle chassis, and is also referred to as "tail end". The guide unit is preferably the longitudinally extending part of a longitudinal link of a utility vehicle chassis, which serves in particular for the defined and sprung or damped mounting of the rigid axle, or at least one axle stub, of the utility vehicle chassis relative to the utility vehicle frame. For this purpose, the guide unit transmits forces and bending moments, and possibly also torsional moments, via its first fastening section, and via a preferably provided bearing section, between the frame of the utility vehicle, the support unit and a fastening region for the rigid axle or the axle stub of the utility vehicle chassis. The second plane is preferably the plane which is oriented transversely, or perpendicular, to a fastening surface and also orthogonally with respect to the width of the second fastening section. The width of the second fastening section is preferably measured in a horizontal direction, or preferably in a direction running parallel to the fastening surface. It is particularly preferable for the second plane to bisect the width of the second fastening section. The second plane is preferably arranged in the support unit so as to divide the second fastening section into two equal-sized fastening section parts. In particular if the second fastening section has a shape which differs from a rectangular shape, the width of the fastening section is preferably assumed to be the mean width, wherein the second plane lies in the support unit at half width.

It is preferable if, on the load-bearing region of the support unit, there is provided a fastening means which has an orthogonal offset with respect to the second plane. At least one fastening means is preferably provided for the fixing of a spring unit to the load-bearing region of the support unit. The fastening means is preferably in the form of a bore. Said fastening means on the load-bearing region of the support unit preferably engages directly or indirectly into corresponding further fastening means, or directly into a fastening region of a spring unit, and fixes the latter to the support unit. The fastening means preferably has an orthogonal or perpendicular offset with respect to the second plane. It is particularly preferable if, in the assembled state, the fastening means also has an orthogonal offset with respect to the first plane.

It is furthermore preferable if, on the load-bearing region, there are provided at least two fastening means which each have an orthogonal offset with respect to the second plane, wherein it is particularly preferable for the offset of the first fastening means to differ from the offset of the second fastening means. Here, it is particularly preferable for the two fastening means to be arranged on a straight line running orthogonally with respect to the second plane, and to have in each case a different spacing from the second plane. By means of this particularly preferred design, it is possible, by rotating or interchanging the support unit, to provide different fastening locations for a spring unit on the steering unit. Here, the fastening location of the spring unit relative to the steering unit is in each case defined preferably by the location of the one or more fastening means. It is particularly preferable for a multiplicity of fastening means to be provided on the load-bearing region, of which fastening means only one lies in the second plane and all of the other fastening means have in each case an orthogonal offset with respect to the second plane, wherein the offsets of the individual fastening means particularly preferably differ from one another. By means of an expedient distribution of the offsets of the respective fastening means, it is thus possible to realize a multiplicity of possible combinations for fastening locations of a spring unit on the steering unit, which can be doubled through the possibility of rotating the support unit through 180° relative to the guide unit or interchanging the support unit for a second support unit which is of mirror-symmetrical form.

The guide unit advantageously extends substantially along a first plane, wherein, in the assembled state, in which the support unit is fixed by way of the second fastening section to the first fastening section of the guide unit, the first plane lies parallel to the second plane. In the present case, the first plane is preferably a plane which stands vertically in space and which extends in the vehicle longitudinal direction, wherein the first plane is, in relation to the steering unit, preferably the plane which is orthogonal to the axis, about which the guide unit can be pivotably fixed to the frame of the utility vehicle. Here, the guide unit is preferably a tube or preferably hollow body-like component, wherein it is however particularly preferable for geometries which are optimized in terms of force flow to be provided, which for example exhibit a non-linear or non-cylindrical extent of the guide unit. Said geometries are advantageously optimized in terms of force flow by way of corresponding roundings and curved outer and inner surfaces, in such a way that, with a low inherent weight of the guide unit, high forces and moments can be transmitted. In this context, it is thus preferable for the guide unit to extend not rectilinearly along the first plane, but rather to have regions of relatively large spacing and regions of relatively small spacing from the first plane. In the assembled state, that is to say in the state in which the support unit is fixed by way of its second fastening section to the first fastening section of the guide unit, the support unit is preferably also of asymmetrical form with respect to the first plane. Here, there is particularly preferably an asymmetrical geometry of the load-bearing region of the support unit with respect to every plane parallel to the first plane, that is to say, in other words, the support unit, in its installed state, is of asymmetrical form with respect to a vertical plane. The assembled state of the support unit on the guide unit is preferably defined in that a fastening surface provided on the support unit is oriented substantially horizontally, or in other words, is oriented perpendicular to the first plane.

The load-bearing section preferably has a fastening surface which extends substantially transversely with respect to the second plane. "Substantially" can be understood to mean "predominantly". Accordingly, the fastening surface preferably has a large-area, plate-shaped or planar part which stands transversely with respect to the second plane. In the edge regions, or else if preferred projections or recesses are provided on the fastening surface, the geometry of the fastening surface deviates, in regions, from the planar form, wherein, under the wording "substantially", said regions can nevertheless be counted as part of the fastening surface. The wording "substantially" may also be understood analogously to this for further features of this application.

The guide unit advantageously has, at its distal end situated opposite the first fastening section, a bearing section for pivotable mounting on a vehicle frame, wherein the pivot axis of the pivotable mounting lies orthogonally or perpendicularly with respect to the first plane. The bearing section of the guide unit is preferably in the form of a bearing eyelet into which there can particularly preferably be inserted a bushing or a sleeve by means of which the guide unit is pivotably mountable, or preferably mounted, on a vehicle frame, particularly preferably on the bearing block of a vehicle frame. Here, it is particularly preferable for the position of the first plane in the guide unit to be defined by way of the pivotable mounting of the guide unit, particularly preferably in that the first plane lies orthogonally with respect to the pivot axis of the pivotable mounting of the guide unit.

The first fastening section particularly preferably extends tangentially with respect to a circular path running around the pivot axis. The first fastening section is preferably in the form of an areal section which preferably serves as a welding surface for the fixing of the second fastening section of the support unit to the first fastening section of the guide unit. Here, it is particularly preferable for the welding surface to be substantially in the form of a planar surface which extends tangentially with respect to a circular path running around the pivot axis. It is alternatively preferable for the first fastening section to be in the form of a curved surface, wherein the curvature runs preferably substantially along a circular path running around the pivot axis. By means of a curved first fastening section, it is possible, with the selection of different fastening locations of the support unit on the first fastening section, to simultaneously select both the vertical location and/or orientation of the support unit relative to the guide unit, and also to simultaneously set a certain angular offset of the support unit relative to the guide unit, and thus also an angular offset of the fastening surface relative to the guide unit. In this way, it can preferably be achieved that a spring unit fastened to the support unit can always compress and extend as vertically as possible, whereas the steering unit is displaced relative to the frame of the vehicle in a provided pivoting range.

It is furthermore preferable for the load-bearing section to have at least one fastening means for the fixing of a spring unit, which fastening means, in the assembled state of the steering unit, is spaced apart from the first plane. Here, it is particularly preferable for the fastening surface preferably provided on the support unit to be oriented substantially parallel to a plane lying around the pivot axis about which the guide unit is pivotable. This preferably emerges from the geometric definition of the second plane by way of the fastening surface and the geometric definition of the first plane by way of the pivot axis. It is furthermore preferable for the load-bearing section to have at least one fastening means for the fixing of a spring unit, wherein the fastening means is preferably a projection, which can be placed in engagement or preferably is in engagement for example with the plunger piston of a spring unit, or preferably a bore, through which a screw for the fastening of a spring unit to the load-bearing section can be guided. Here, it is particularly preferable for the fastening means to be spaced apart from the second plane, as a result of which, by rotating the support unit or by using a second support unit of mirror-symmetrical design with the same geometrical definitions as the first support unit described here, at least two different fastening locations, in relation to the guide unit, of a spring unit on the steering unit are realized.

It is particularly preferable for the support unit to be formed as a left-hand support unit or as a right-hand support unit. A support unit formed as a left-hand support unit is preferably distinguished by the fact that, as viewed from the second fastening section of the support unit, that part of the fastening surface of the support unit which is situated to the left of the second plane is larger than that part of the fastening surface which is situated to the right of the second plane. For a support unit formed as a right-hand support unit, it is correspondingly the case that, preferably, that part of the fastening surface which is situated to the right of the second plane is larger than that part which is situated to the left of the second plane. It is furthermore preferably also possible for a larger or smaller number of the fastening means provided in each case to the left and to the right of the second plane to serve as a criterion. Accordingly, for example in the case of a support unit formed as a left-hand support unit, it is possible for a greater number of fastening means to be provided to the left of the second plane than to the right of the second plane as viewed from the second fastening section. It is particularly preferable if the support unit formed as a left-hand support unit, as viewed from above, that is to say in a view directed vertically onto the fastening surface, has a continuously convex curvature on its side situated to the left of the second fastening section, and has an at least regionally concave curvature on the opposite side. Here, it is particularly preferable for the left-hand support unit and the right-hand support unit to be of mirror-symmetrical design with respect to one another. Here, the plane of symmetry of the mirror symmetry preferably lies parallel to the second planes of the left-hand and right-hand support units.

In a preferred embodiment, the support unit has two opposite fastening surfaces, wherein the load-bearing region is plane-symmetrical with respect to a plane lying between the fastening surfaces. It is particularly preferable here for the plane that lies between the fastening surfaces of the support unit to be oriented substantially perpendicular to the second plane. If the support unit is rotated or pivoted about the line of intersection between the second plane and the plane of symmetry of the load-bearing region into a pivoting location rotated through 180°, it is thus possible, instead of one fastening surface, for the in each case opposite fastening surface to be oriented such that a spring unit can be fastened thereto. In combination with the feature of the support unit that the latter is of asymmetrical form with respect to the second plane, this preferably gives rise, in the selection of one of the two pivoting locations of the support unit about the straight line of intersection or line of intersection, to two possibilities for the arrangement of the fastening means, preferably provided on the support unit, relative to the guide unit in the assembled state of the support unit. It is preferable for there to be provided on the support unit at least two fastening means in the form of bores, which particularly preferably extend all the way through the load-bearing region and are in each case spaced apart from the second plane to different extents. This gives rise, in a first pivoting location of the support unit relative to the guide unit, to two fastening locations of a spring unit, and, if the support unit is rotated through 180° about the line of intersection, two further fastening locations for a spring unit. It would likewise preferably be possible, on each side of the support unit and thus on each of the two fastening surfaces, for a total of four individual fastening means to be provided, which have in each case a different spacing from the second plane. It is self-evident that, by increasing the number of fastening means, the number of possible fastening locations of a spring unit on the steering unit can also be increased. Here, it is particularly preferable that a selected number of standard fastening locations can be set through arrangement of the support unit on the guide unit, wherein the steering unit can advantageously be correspondingly adapted to the chassis and frame widths that are common in utility vehicles.

According to the invention, a chassis system for utility vehicles is provided, comprising a frame and two steering units which can be pivotably fixed to the frame, wherein the frame has a transverse direction, wherein each of the steering units has a support unit with at least one fastening means, wherein, by rotating the fastening position of the support unit on the respective guide unit and/or by interchanging the support units for one another, at least one fastening means can be placed into a location which is offset or displaced in parallel with respect to the transverse direction. The chassis system for utility vehicles preferably comprises the components required for connecting two wheels to the frame of the utility vehicle, such as steering units, spring units and further peripheral systems of the chassis of the utility vehicle. Here, at least two of the above-described steering units are pivotably fixed to the frame. The frame has a transverse direction, which particularly preferably lies parallel to the pivot axis or to the pivot axes of the steering units. Furthermore, the steering units have in each case one support unit, wherein the support units are designed such that, by virtue of the support units being rotated or interchanged for one another, at least one of the fastening means provided on the support units can be arranged in one of at least two possible locations relative to the frame or relative to the transverse direction of the frame.

The chassis system advantageously has two steering units, wherein a left-hand support unit or a right-hand support unit can be or is fixed to one of the two guide units, and a right-hand support unit or a left-hand support unit can be fixed to the in each case other guide unit, wherein, in relation to a plane lying centrally between the two first planes of the steering units, different fastening locations for a spring unit on the support units are provided. It is thus preferably also possible for two left-hand support units to be provided on the chassis system, wherein, by exchanging the two left-hand support units for in each case one right-hand support unit, different fastening locations are made available. This preferred embodiment is suitable for enabling asymmetrical frame constructions of utility vehicles to likewise be equipped with chassis systems according to the invention, which are inexpensive to produce.

The chassis system preferably has two steering units, wherein a first steering unit has a left-hand support unit and a second steering unit has a right-hand support unit, wherein the left-hand support unit can be fixed to one of the two guide units and the right-hand support unit can be fixed to the in each case other guide unit, wherein the fastening means of the left-hand support unit has a first spacing from the fastening means of the right-hand support unit. It is preferable that, by virtue of the left-hand and right-hand support units being interchanged for one another and fixed to the respective guide units, the spacing of the fastening means of the left-hand support unit from the fastening means of the right-hand support unit can be changed. Here, it is preferably firstly provided that, as viewed in the vehicle longitudinal direction, the left-hand support unit is fastened to the steering unit arranged on the left or to the guide unit of the steering unit that is arranged on the left, and the right-hand support unit is fixed to that steering unit or guide unit which is fixed to the vehicle frame on the right. This fixing configuration gives rise to a first possible spacing of the fastening means of the left-hand support unit from the fastening means of the left-hand support unit from the fastening means of the right-hand support unit. In a second alternative arrangement of the left-hand and right-hand support units on the chassis system, it is also possible for the left-hand support unit to be arranged on the right-hand side and for the right-hand support unit to be arranged on the left-hand side of the utility vehicle, whereby a different spacing of the two fastening means to one another can be set. This basic principle makes it possible, through selection of the fastening locations of a spring unit on the steering unit, which can be determined through selection of the fastening location or position of the left-hand and right-hand support units, for spring units of different size to be fixed to the vehicle frame or for different vehicle frame types or widths to be able to be connected to the same set of steering units, that is to say guide unit and support unit. The major advantage of the described invention is thus that, with one set of two guide units, which can always be of identical design, and one set of left-hand and right-hand support units, it is made possible to equip virtually all known chassis types or utility vehicle chassis.

The chassis system preferably has two steering units on which there are provided support units which are of plane-symmetrical form, wherein the support units can be fixed to the respective guide unit in each case in one of two fastening positions, in such a way that the fastening means of the support units have one of two possible spacings to one another. In other words, therefore, use is made of the support units, which are of mirror-symmetrical form about a substantially parallel to two fastening surfaces and which can in each case be fixed to the guide unit in a first location or can be fixed to the guide unit in a second fastening position rotated through 180°. It is advantageous in the case of this preferred embodiment that, instead of a left-hand and a right-hand support unit, only a single type of support unit is required, of which in each case two are used in the chassis system, wherein, by rotating the fastening position of the support unit on the guide unit, at least two different spacings of the fastening means of one support unit from the fastening means of the other support unit can be set.

It is particularly preferably the case that, in the assembled state of the steering units, the spacing of the second plane from the respective first plane is equal to the spacing of at least one fastening means from the second plane. Since the first plane of the steering unit can be regarded as a reference geometry for the guide unit of the steering unit, wherein the guide unit is preferably pivotably fixed to the frame of the utility vehicle in a constant location relative to the transverse direction of the frame, the spacing of the fastening means relative to the first plane equates to the spacing of the fastening point, at which a spring unit can be fixed to the steering unit, from the frame of the utility vehicle in the transverse direction. The second plane of the support unit preferably lies centrally and transversely with respect to the second fastening section of the support unit, and is therefore preferably always arranged with the same spacing from the first plane regardless of whether the support unit is arranged in a rotated installation position or as a left-hand or right-hand support unit on the guide unit. For the preferred situation in which one of the fastening means has a spacing from the second plane which is equal to the spacing of the second plane from the first plane, it is the case, in one of the possible installation positions or installation locations of the support unit, that the second fastening means lies in the first plane or is intersected by the first plane. In this preferred situation, the fastening means therefore preferably lies exactly in the plane which runs centrally through the bearing section of the guide unit, and thus, under the action of load or when a force is exerted on the fastening means perpendicular to the fastening unit, no torsion moments arise in the guide unit. In other words, the load on the guide unit is in this case a simple bending stress in the material of the guide unit, which reduces the expected service life of the guide unit to a lesser extent. It is furthermore preferable for the fastening means or at least one of the fastening means to be intersected by the second plane, wherein said fastening means has an unchanging spacing from the first plane in the event of rotation or interchanged arrangement of the support unit.

It is furthermore preferable that, in the assembled state of the steering units, the spacing of the second plane from the respective first plane is not equal to the spacing of a fastening means from the second plane. The fastening means, which has a spacing from the second plane which differs from the spacing of the second plane from the first plane, will have a changing spacing to the first plane in the case of rotation or interchanged arrangement of the support units in the respective guide unit, as a result of which, by rotating or interchanging the support unit, two different fastening positions of a spring unit in relation to the frame of the utility vehicle can be provided.

It is particularly preferable for the support units to have in each case three fastening means, wherein at least two fastening means are spaced apart from the second plane. By means of this preferred embodiment of the support units, which may be a support unit of plane-symmetrical form, a left-hand or a right-hand support unit, it is possible that, as a result of rotation or interchanging of the support units, at least two fastening means assume, relative to the first plane, a location different to that which they would have in the in each case other rotational or fastening position. This thus gives rise to at least ten possible fastening positions of a spring unit relative to the frame, simply through the use of two steering units according to the invention which have an each case only three fastening means.

The invention encompasses a method for producing a support unit (4), comprising the steps:
 a) providing a tubular main body,
 b) performing a deformation process on the main body, wherein the outer geometry of the main body is deformed such that at least two fastening surfaces are formed thereon,
 c) performing a cutting process on the deformed main body, wherein at least two support units are produced from the main body, wherein each support unit has a second fastening section and a load-bearing section, wherein a second plane lies orthogonally with respect to a width of the second fastening section in the carrier unit, and wherein the load-bearing section is of asymmetrical design with respect to the second plane.

The production method according to the invention is distinguished by the fact that at least two, but preferably a multiplicity of, support units can be produced with a small number of method steps. Here, as deformation methods, use is preferably made of internal high-pressure forming, as even complex asymmetrical structures can be formed using this method. During the deformation, on the tubular or cylindrical main body, there are formed preferably planar fastening surfaces, to which an air spring is preferably later fixed. It is preferably also the case that, during the deformation, one or a multiplicity of fastening means is or are formed. The main body formed in this way is, by way of a cutting process, divided into at least two, preferably a multiplicity of, support units. A particularly suitable cutting method is laser beam cutting, which ensures a high cut edge quality with little influencing of the microstructure of the material in the cut region. Alternatively, it would also be possible to use water jet cutting, because here, virtually no temperature increase occurs at the cut edges, whereby the microstructure changes in the cut edge region are even less pronounced.

Further advantages and features of the present invention will emerge from the following description with reference to the appended figures. It is self-evident that the features presented for one of the embodiments may also be used in other embodiments unless this is expressly ruled out.

BRIEF DESCRIPTION OF THE DRAWINGS

In the figures:

FIGS. 2a, 2b show two plan views of preferred embodiments of the steering unit according to the invention, FIG. 3 shows a side view of a preferred embodiment of the chassis system according to the invention, FIG. 4 shows a further side view of a further preferred embodiment of the chassis system according to the invention, FIG. 5a shows a plan view of a left-hand unit, FIG. 5b shows a plan view of a right-had support unit;

DETAILED DESCRIPTION OF THE PREFERRED EMBODIMENTS

Figure 1:
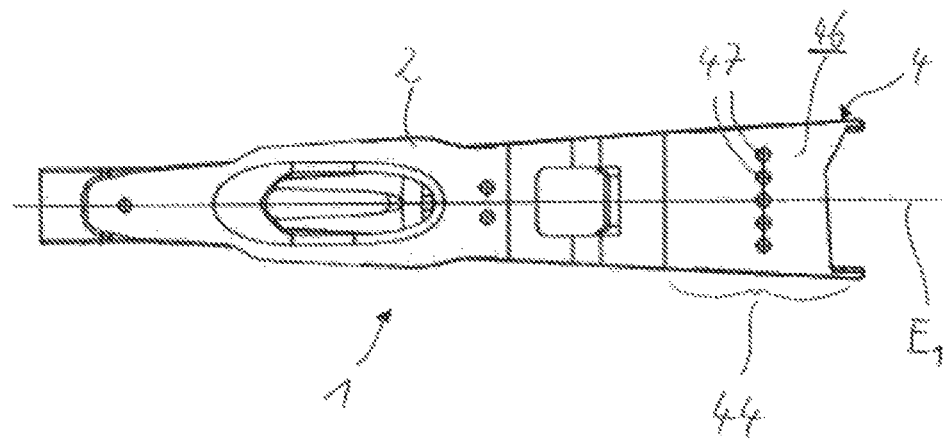
FIG. 1 shows an embodiment of a steering unit known from the prior art.

FIG. 1 shows a plan view of a steering unit 1 known from the prior art, wherein the steering unit 1 has a guide unit 2 and a support unit 4 which is formed in one piece with the guide unit, wherein the support unit 4 has a load-bearing section 44 on which there are provided five fastening means 47. Here, the fastening means 47 serve for the fixing of a spring unit (not shown), which is mounted on the fastening surface 46. The hitherto known arrangement of multiple fastening means 47 adjacent to one another, of which however in each case only one or a small number were used for fixing a spring unit to the steering unit 1, gives rise to the problem that a major part of the load-bearing section 44 of the steering unit 1 remains unutilized, and thus the weight of and the structural space required by the steering unit 1 are unnecessarily increased. Furthermore, it is known from the prior art for a steering unit 1 to be of plane-symmetrical form with respect to a first plane $E_1$.

Figure 2A:
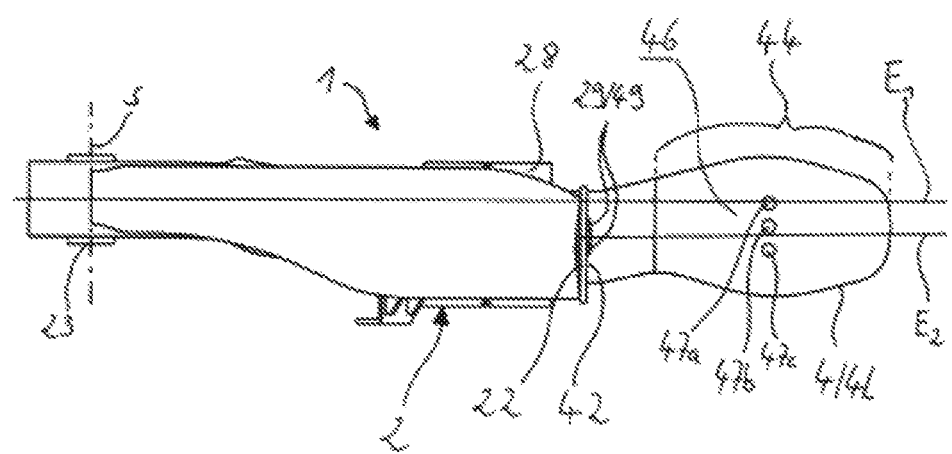

FIG. 2a shows a first plan view of a preferred embodiment of the steering unit 1 according to the invention, having a guide unit 2 and a support unit 4. The guide unit 2 has a substantially elongate extent which extends, for the most part, in or along a first plane $E_1$. At a first distal end (at the left in the figure), there is provided a bearing section 23 in which the guide unit 2 and thus preferably the steering unit 1 as a whole can be fixed, so as to be pivotable about a pivot axis S, to the frame of a utility vehicle (not shown). At its distal end situated opposite the bearing section 23, the guide unit 2 has a first fastening section 22, wherein a second fastening section 42 of the support unit 4 can be or is fixed to said fastening section 22. The fixing of the support unit 4 to the guide unit 2 is preferably performed by way of a welding process, wherein a thermal welding process or a friction welding process may particularly preferably be used. Furthermore, the guide unit 2 has an axle fastening section 28, which particularly preferably serves for accommodating an axle tube or an axle stub of a utility vehicle chassis. The support unit 4 is, in the present embodiment, preferably a left-hand support unit 4L, wherein this is distinguished by the fact that that part of the fastening surface 46 which is situated to the left of the second plane $E_2$ (at the top in the figure) as viewed from the second fastening section 42 is larger than that part of the fastening surface 46 which is situated to the right of the second plane $E_2$ as viewed from the second fastening section 42. The second plane $E_2$ lies, in the support unit 4, preferably transversely or particularly preferably perpendicularly with respect to the fastening surface 46, and intersects the second fastening section 42 preferably centrally. Here, "centrally" in the second fastening section 42 preferably refers to the half value of the mean extent of the second fastening section 42 orthogonally with respect to the second plane $E_2$. The figure shows the preferred assembled state of the steering unit, that is to say the state in which the support unit 4 is fixed to the guide unit 2, wherein preferably, the first plane $E_1$ is oriented parallel to the second plane $E_2$. The support unit 4 furthermore preferably has three fastening means 47 which, as illustrated in the figure, are designated as fastening means 47a, fastening means 47b and fastening means 47c. The figure also shows the advantageous feature of the support unit 4 whereby the fastening means 47 each have a different spacing from the second plane $E_2$, wherein the spacing of the fastening means 47a from the second plane $E_2$ is preferably equal to the spacing of the first plane $E_1$ from the second plane $E_2$. Thus, if a spring unit 8 (not shown) is screwed onto the fastening means 47a and is thus arranged preferably centrally around the fastening means 47a, no torsion moments about an axis of rotation lying in the first plane $E_1$ arise in the event of loading of the spring unit 8 and in the event of a force being transmitted, perpendicular to the fastening surface 46, to the support unit 4. It is thus advantageously the case that no torsion arises in the guide unit 2 or in the first fastening section 22 or in the second fastening section 42. In this way, it is preferably possible for the guide unit 2 to be dimensioned to be less strong or more lightweight, whereby weight is saved. Furthermore, no disadvantageous bending moments or torsion moments arise in the pivotable mounting of the steering unit 1 in the bearing section 23, and the service life thereof can be increased. It is self-evident that, owing to the asymmetrical form of the support unit 4 in relation to the second plane $E_2$, the overall width of the load-bearing region 44 or of the fastening surface 46 can be considerably reduced in relation to the prior art (see FIG. 1), whereby the structural space requirement of the steering unit 1 is particularly preferably reduced. Through the possibility of providing a left-hand or a right-hand support unit 4R or 4L or a rotated arrangement of the support unit 4 of plane-symmetrical form, it is the case, despite the smaller width of the fastening surface 46, that the same number of fastening possibilities as in the steering unit 1 known from the prior art (see FIG. 1) is maintained. It is advantageously the case that, on the first fastening section 22 and on the second fastening section 42, there is provided in each case one locating aid 29, 49 which is preferably in the form of a recess or projection. Here, the locating aids 29, 49 serve for ease of orientation of the second fastening section 42 on the first fastening section 42. In the embodiment shown, two locating aids 29 in the form of projections are provided on the first fastening section 22, and two locating aids 49 in the form of recesses are provided on the second fastening section 42. The locating aids 29, 49 extend preferably along the perpendicular to the image plane of the figure, and can thus, as a rail-like guide, define a particular position of the support unit 4 relative to the guide unit 2 along a perpendicular to the first and/or second plane $E_1$, $E_2$. At the same time, the vertical fastening location of the support unit 4 along the guide unit 2 (see FIGS. 3, 4 and 7) can be selected, by the person assembling the steering unit 1, by way of a displacement along the locating aids 29, 49.

Figures 2B, 3:
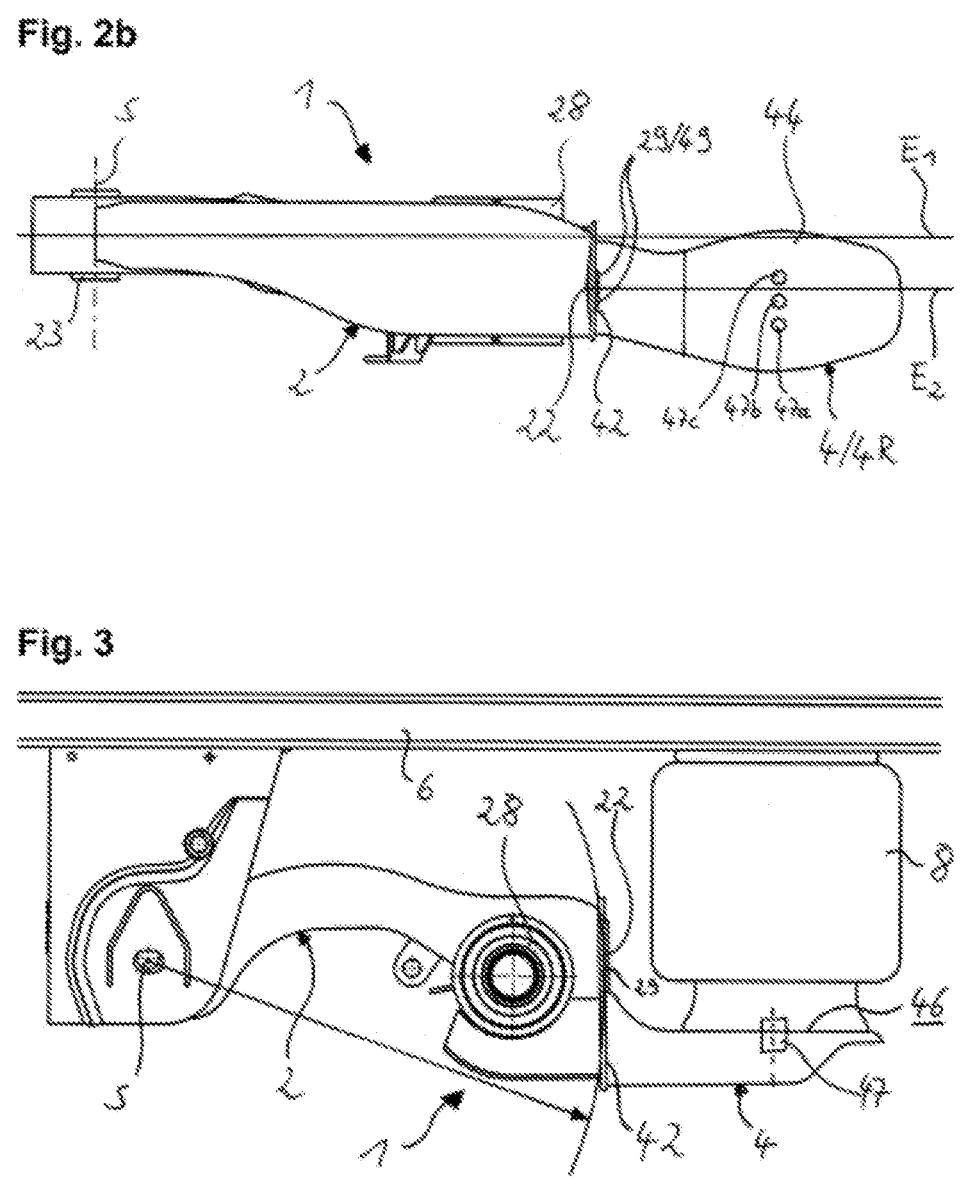

FIG. 2b shows a plan view of a further preferred embodiment, wherein, by contrast to the steering unit 1 shown in FIG. 2a, the steering unit shown in FIG. 2a now has a right-hand support unit 4R. Here, the guide unit 2 shown in FIG. 2b corresponds to the guide unit 2 shown in FIG. 2a. It can be clearly seen that the right-hand support unit 4R shown in FIG. 2b is of plane-symmetrical form with respect to the left-hand support unit 4L shown in FIG. 2a, wherein, by means of the arrangement, shown in FIG. 2b, of the right-hand support unit 4R on the guide unit 2, three further fastening locations of a spring unit 8 (not shown) on the steering unit 1 are possible, which differ from the fastening locations that are possible in FIG. 2a. It is particularly preferable that the spacing of the plane $E_2$ to the plane $E_1$ is equal in both embodiments, that is to say in the embodiment shown in FIG. 2a and in that shown in FIG. 2b, wherein also, the spacing of the respective fastening means 47a, 47b, 47c from the second plane is in each case equal to the spacing of that in the in each case other embodiment shown.

FIG. 3 shows a preferred embodiment of the chassis system according to the invention, wherein a frame 6 of the chassis has a bearing block on which the guide unit 2 of the steering unit 1 can be or is mounted so as to be pivotable about a pivot axis S. Here, the first fastening section 22 extends, as shown in the figure, tangentially with respect to a circular path running around the pivot axis S, wherein the first fastening section 22 is preferably in the form of a substantially planar surface. The second fastening section 42 of the support unit 4 is preferably formed so as to be smaller than the first fastening section 22, and can preferably be fixed to the first fastening section 22 at different heights relative to the frame 6. Furthermore, the chassis system preferably has a spring unit 8 which, on the fastening surface 46, is fixed to the support unit 4 way of a fastening means 47. It is preferably the case that, between the first fastening section 22 and the bearing region 23 (not shown), the guide unit has an axle fastening section 28. The spring unit 8 is preferably the air spring of a utility vehicle. It is alternatively preferably also possible for the spring unit 8 to be in the form of a helical or spiral spring.

FIG. 4 shows a further side view of a preferred embodiment of the chassis system according to the invention, wherein the steering unit 1 shown here differs from the steering unit 1 shown in FIG. 3 merely in that the support unit 4 is fixed to the guide unit 2 having been rotated or pivoted through an angle α with respect to said guide unit 2. This preferred embodiment makes it possible for the axle fastening section 28 in the embodiment shown in FIG. 4 to have a greater spacing to the frame 6 of the vehicle than the axle fastening section shown in FIG. 3, wherein the fastening surface 46 is nevertheless still oriented horizontally, or substantially parallel to the lower edge of the frame 6. The angular offset a may in this case preferably be realized through the introduction of a triangular or wedge-shaped weld seam or of individual wedge-shaped components, or by way of a curved design of the first fastening section 22 (see FIG. 7). By means of this preferred embodiment, it is possible to avoid a situation in which the spring unit 8 is subjected to oblique loading at the normal vehicle height, that is to say in the neutral position of the steering unit 1 relative to the frame 6, as shown in FIG. 3 and FIG. 4. In other words, when the utility vehicle is loaded with a certain standard payload, the spring longitudinal axis 82 is preferably perpendicular to the fastening surface 46 and particularly preferably also perpendicular to the fastening surface of the spring unit on the lower edge of the frame 6. Through the avoidance of an uneven or oblique loading of the spring unit 8, the service life thereof can be increased.

FIGS. 5a and 5b show a plan view of two support units 4, wherein the support unit shown on the left in the figure is in the form of a right-hand support unit 4R and the support unit shown on the right in the figure is in the form of a left-hand support unit 4L. The support units 4R and 4L are preferably mirror-symmetrical with respect to one another, wherein the axis of symmetry is particularly preferably parallel to the second planes $E_2$ of both support units 4R, 4L. It is furthermore preferable for the support units 4R and 4L to have three fastening means 47, wherein a first fastening means 47a has an offset or a spacing $V_a$ to the second plane, a second fastening means 47b has an offset $V_b$, and a third fastening means has an offset $V_c$, which is negative in relation to the other fastening means 47a, 47b, to the second plane. It is advantageous for the offset $V_a$ to be at least twice as great as the offset $V_b$ and/or the offset $V_c$, because a broad spectrum of fastening possibilities for spring units 8 is realized in this way. The adjacent fastening means 47 are preferably spaced apart from one another in each case by 5 mm-100 mm, particularly preferably by 10 mm-50 mm, and particularly preferably by approximately 20 mm, in order to be able to advantageously provide standard configurations for utility vehicles on the market. Alternatively, a spacing of the fastening means 47 of 30 mm may also be used in order to be able to cater for a particularly common standard configuration of utility vehicles. The second plane $E_2$ is preferably arranged centrally in relation to the width B of the second fastening section 42. It is furthermore preferable for the second plane $E_2$ to lie orthogonally with respect to the width B of the second fastening section 42. The support units 4R and 4L are, according to the invention, of asymmetrical form about the second plane.

Figure 6:
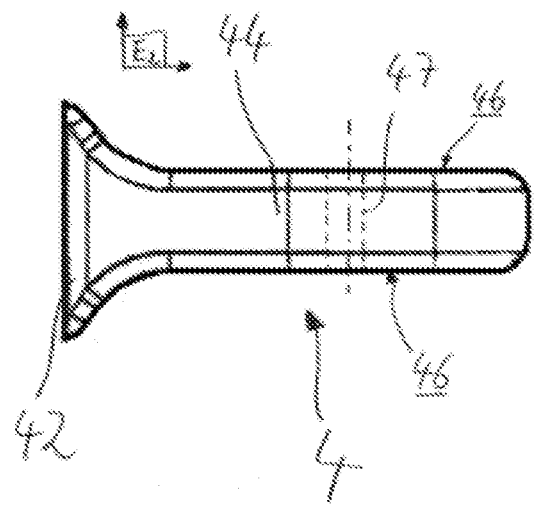
FIG. 6 shows a preferred embodiment of a support unit of plane-symmetrical form.

FIG. 6 shows a side view of a preferred embodiment of a support unit 4 according to the invention, wherein the support unit 4 is preferably of plane-symmetrical form with respect to a plane lying between the two fastening surfaces 46. It is self-evident that said support unit 4 according to the invention can be fixed to the guide unit 2 (not shown) in each case in a location rotated through 180° relative to said guide unit. The support unit 4 of plane-symmetrical form as shown in FIG. 6 is of asymmetrical form with respect to the plane $E_2$, which is arranged preferably perpendicular to the fastening surfaces 46. Between the load-bearing section 44 and the second fastening section 42 of the support unit 4, there is preferably provided a rounded geometry which firstly ensures improved transmission of forces and moments between the second fastening section 42 and the load-bearing section 44 and which secondly prevents damage to the air spring bellows of a spring unit 8 (not shown) if the latter, in the fully compressed state of the spring unit 8, comes into contact with the corresponding surfaces of the support unit 4. In other words, sharp-edged surfaces or edges on the support unit 4 are preferably avoided, in order to reduce damage to the air spring bellows and to prevent a notch effect at the edges of the support unit.

Figure 7:
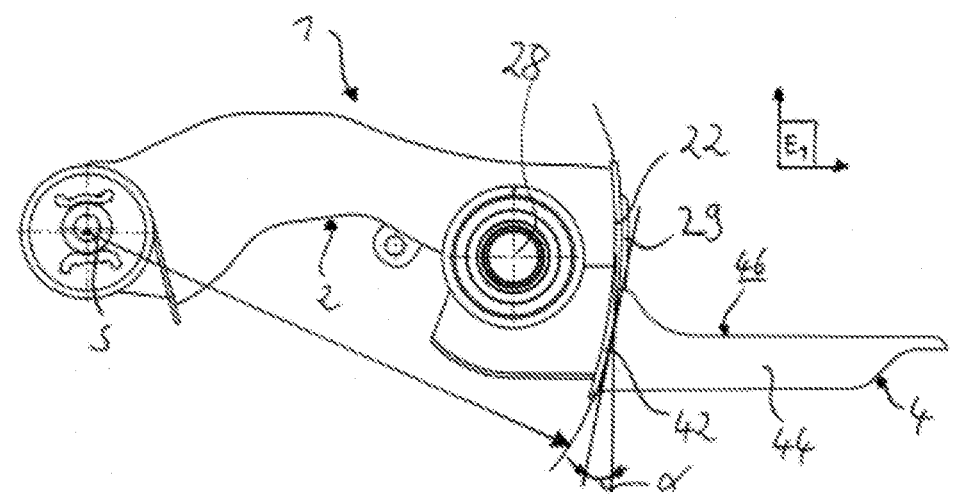
FIG. 7 shows a side view of a preferred embodiment of a steering unit according to the invention.

FIG. 7 shows a side view of a preferred embodiment of a steering unit 1 according to the invention, wherein the guide unit 2 has a first fastening section 22 which is of substantially curved design. Here, as seen in the side view, the curvature of the first fastening section 22 runs concentrically about the pivot axis S of the guide unit 2. The support unit 4 may preferably be arranged on the guide unit 2 at different heights, wherein not only is it possible to set a desired height of the fastening surface 46 relative to the guide unit 2, in particular relative to the axle fastening section 28, but at the same time, the angular offset a is also adapted such that the fastening surface 46, in all possible installation positions, and in the normal loading state of the steering unit 1, lies in a horizontal plane or parallel to the lower edge of the vehicle frame 6 (not shown). By means of this preferred embodiment, the height of the axle fastening section 28 relative to the load-bearing region 44 and in particular relative to the fastening surface 46 of the support unit 4 can be varied, while simultaneously ensuring the parallel orientation of the fastening surface 46 with respect to the frame 6 of the utility vehicle (not shown).

Figure 8:
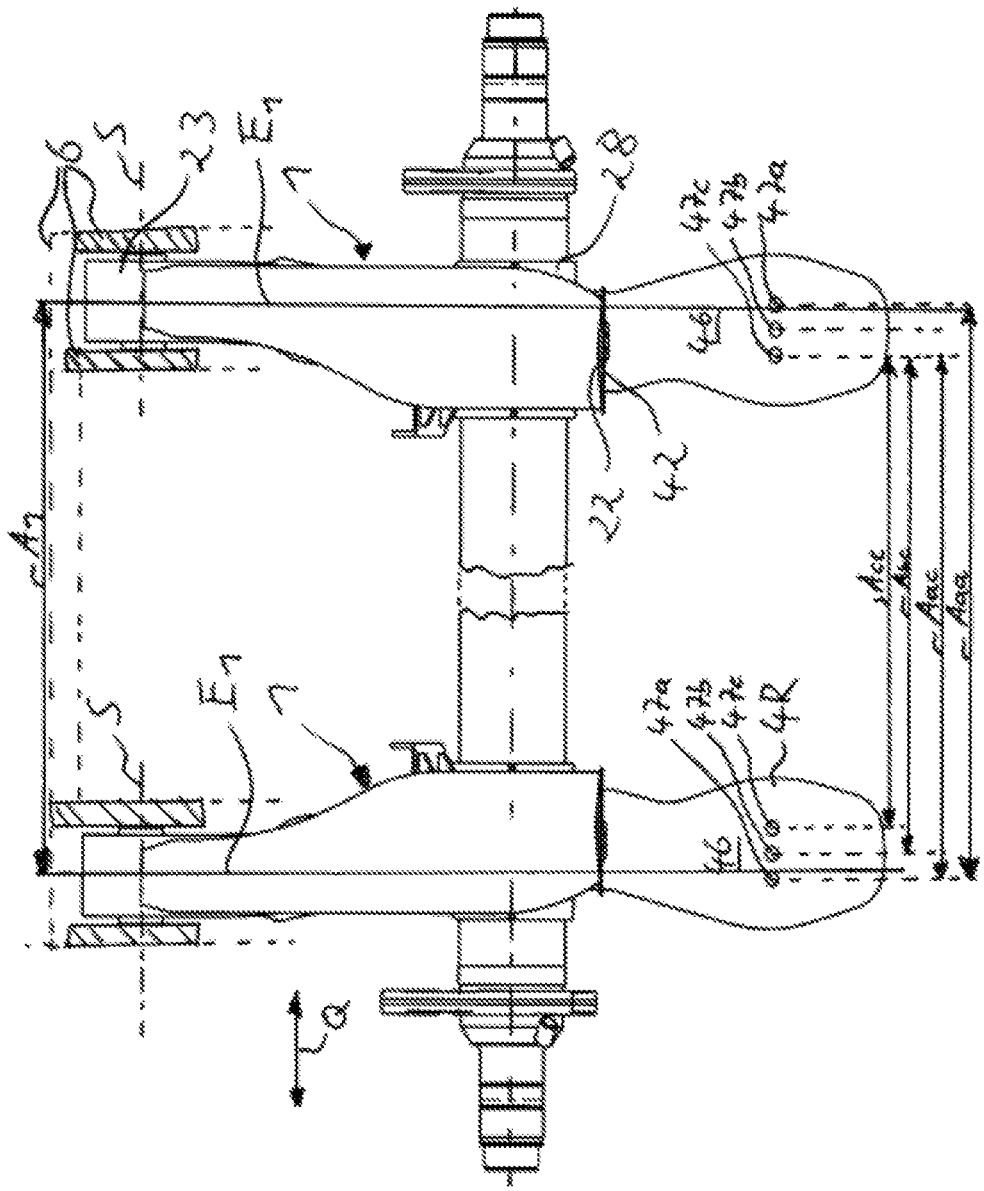
FIG. 8 shows a plan view of an embodiment of the chassis system according to the invention with two steering units according to the invention.

FIG. 8 shows a plan view of a chassis system according to the invention, which has two steering units 1 which are each fixed to the frame 6 of the utility vehicle (illustrated by dashed lines and in section in the region of the bearing blocks) so as to be pivotable about a pivot axis S. Here, the steering unit 1 shown on the left in the figure has a support unit 4 in the form of a right-hand support unit 4R, and the steering unit 1 shown on the right in the figure has a support unit 4 in the form of a left-hand support unit 4L. As an alternative to this embodiment, it would also be possible for the support units 4 to be in the form of plane-symmetrical support units 4, as shown in FIG. 6, wherein the left-hand support unit 4 would be arranged rotated through 180° in relation to the right-hand support unit. The two support units 4, or 4R and 4L, have in each case three fastening means 47a, 47b, 47c, wherein the fastening means 47a, 47b, 47c of the support unit shown on the left-hand side have in each case a spacing A from the corresponding fastening means 47 of the support unit shown on the right-hand side. The designation of the spacings A of the fastening means from one another in this case logically corresponds to the fastening means between which the spacing is measured. It is thus self-evident that the spacing $A_{cc}$ is the spacing between two fastening means 47c, the spacing $A_{bc}$ is the spacing between the fastening means 47b and a second fastening means 47c, or, for example, the spacing $A_{aa}$ is the spacing between two fastening means 47a. Preferably, the spacing $A_1$ of the first planes $E_1$ from one another should be regarded as a reference variable of the frame 6 of the utility vehicle, wherein said spacing is preferably defined by the spacing of the two bearing blocks of the frame 6 of the utility vehicle from one another. The frame 6 of the utility vehicle is preferably of substantially symmetrical form about a plane lying between the first planes $E_1$, wherein consequently, preferably only one pair of fastening means 47a or 47b or 47c on the respective steering units 1 is used for the fixing of a spring unit 8. Thus, in the embodiment shown in FIG. 8, there are three possible fastening positions of a spring unit 8 on the steering unit 1 in relation to the frame 6 of the utility vehicle, expressed in terms of the reference geometry of the first plane $E_1$.

Figure 9:
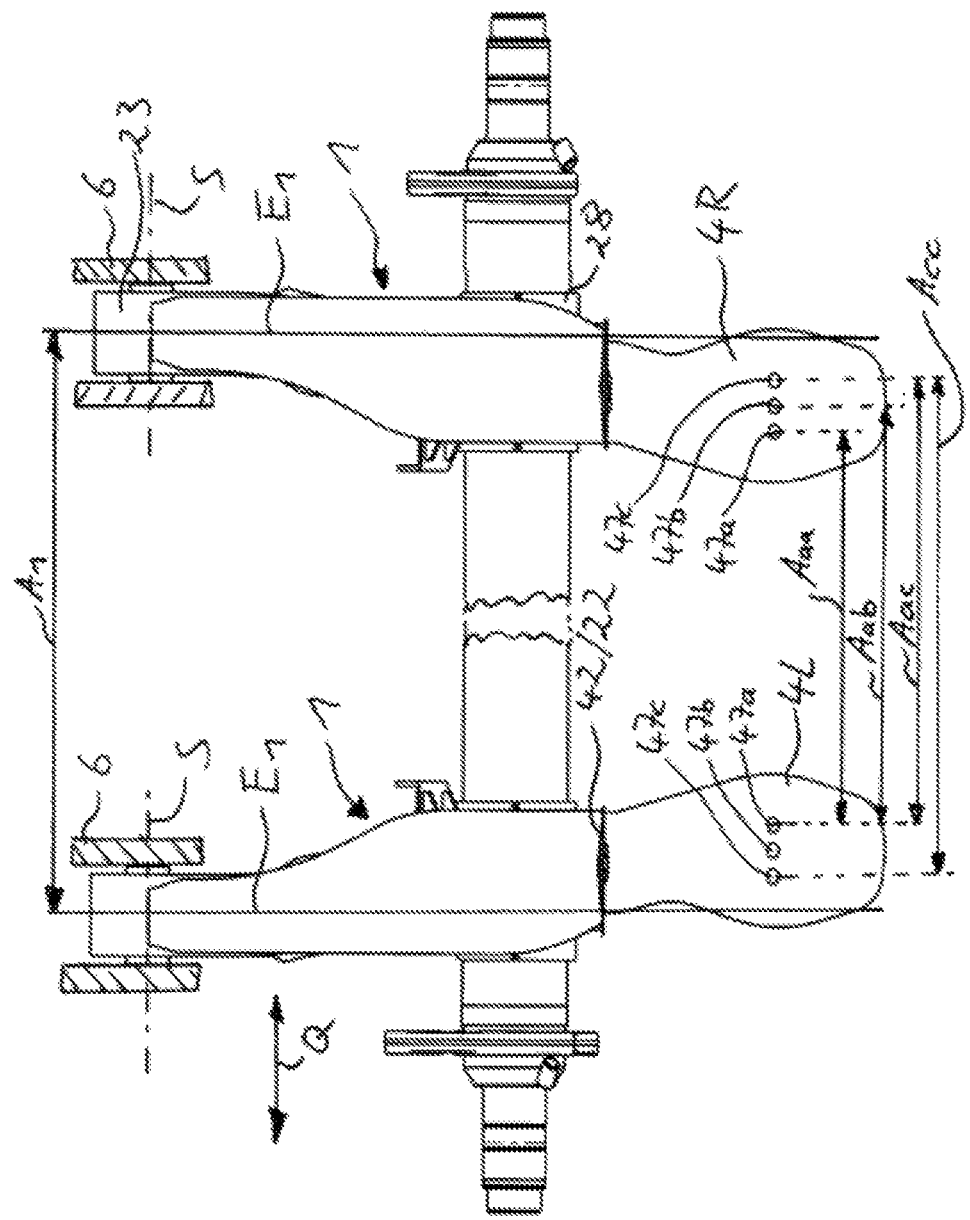
FIG. 9 shows a plan view of an embodiment modified in relation to the embodiment shown in FIG. 8, and FIGS. 10a-d show views of steps of the method according to the invention for producing a support unit.

FIG. 9 shows a further plan view of a preferred embodiment of a chassis system according to the invention, wherein, by contrast to FIG. 8, it is now the case that the left-hand and right-hand support units 4R and 4L have been interchanged for one another, giving rise to further fastening possibilities or fastening locations of a spring unit 8 on the respective steering unit 1 of the chassis system. It could alternatively also be preferable for the support units 4 of plane-symmetrical form shown in FIG. 8 to have been rotated in each case through 180°, giving rise to further fastening possibilities analogously to the interchanging of the left-hand and right-hand support units 4R and 4L. It is self-evident that the number of possible fastening locations can also be increased by increasing the number of fastening means 47a, 47b, 47c, . . . on the support units 4, wherein the addition of a further fastening means 47 by interchanging or rotating the support units 4, 4R, 4L gives rise to in each case two further fastening locations for a spring unit 8 on the steering unit 1. It is preferably the case in the embodiments shown in FIGS. 8 and 9 that the offset $V_a$, $V_b$ or $V_c$ of one of the fastening means 47a, 47b or 47c is in a ratio of 0.005-0.2, preferably 0.01-0.1 and particular preferably of 0.015 to 0.08 in relation to the spacing $A_{aa \ldots cc}$ of the respective fastening means 47a, 47b or 47c from another fastening means 47a, 47b or 47c.

Figure 10A:
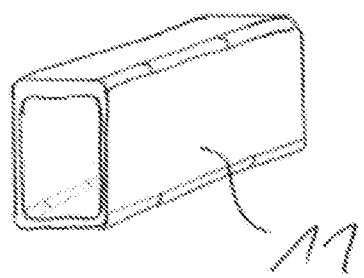
Figure 10B:
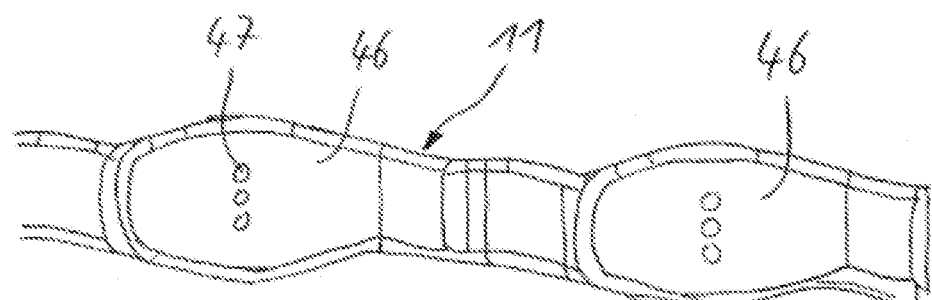
Figure 10C:
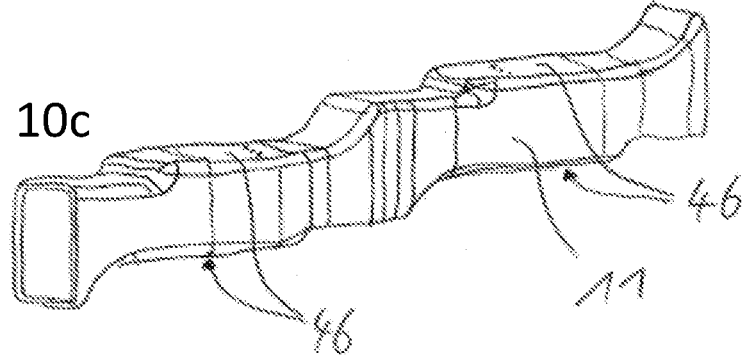
Figure 10D:
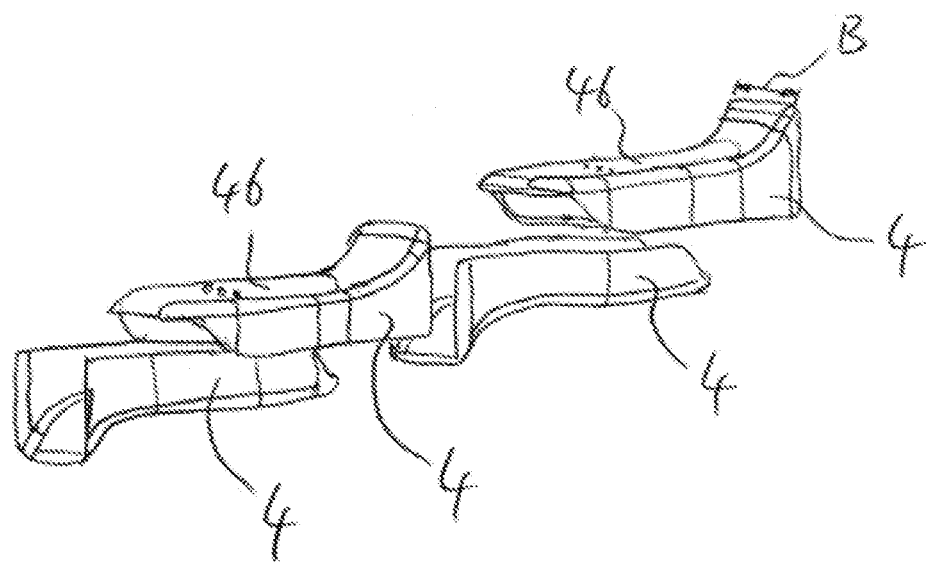

FIGS. 10a-10d show the method steps of a production method for producing a support unit 4. Here, at least two support units 4 as shown in FIG. 10c are produced from a tubular or preferably cylindrical main body 11 as shown in FIG. 10a. The support units 4 preferably have the features of the above-described support units 4 (see FIGS. 1-9) aside from the fact that they are in each case open at one or two sides. By means of the production method according to the invention, the main body 11 from FIG. 10a initially has the shape shown in FIG. 10b imparted to it by way of a forming process, preferably internal high pressure forming. Here, principal outer geometries of a support unit 4, such as a fastening surface 46 and preferably rounded edges and fastening means 47, are formed on the main body 11. In a second production step of the method according to the invention, the main body 11 that has been deformed in this way is divided into at least two support units 4. It is preferably possible, as shown in FIG. 10c, for four support units 4 to be produced from one main body 11. It is self-evident that the number of support units 4 that can be produced from one main body 11 may also be higher, wherein the technical upper limit of said number is defined by the technically manageable maximum size of the undivided main body 11. For the division of the main body 11, use is preferably made of an automated cutting process, such as laser beam cutting, water jet cutting or wire cutting. By means of the manufacturing method thus provided, it is possible for the production costs for the steering units 1 to be further reduced, because not only is it the case that a modular construction of the steering unit 1 yields a greater degree of standardization of the individual parts to be produced, but also, the support units 4 to be produced can be produced easily and inexpensively in a small number of method steps.

REFERENCE DESIGNATIONS

1—Steering unit
2—Guide unit

4—Support unit
4L—Left-hand support unit
4R—Right-hand support unit
6—Frame
8—Spring unit
11—Main body
22—First fastening section
23—Bearing section
28—Axle fastening section
29—Locating aid
42—Second fastening section
44—Load-bearing region
46—Fastening surface
47—Fastening means
47a, 47b, 47c—First, second, third fastening means
49—Locating aid
82—Spring longitudinal axis
α—Angular offset
$A_1$—Spacing of the first planes
$A_{aa}, A_{ab}, A_{ac} \ldots A_{cc}$—Spacing of the fastening means
B—Width of the second fastening section
$E_1$—First plane
$E_2$—Second plane
S—Pivot axis
Q—Transverse direction of the frame
V, $V_a$, $V_b$, $V_c$—Orthogonal offset

The invention claimed is:

1. A control arm for utility vehicles, comprising:
a guide unit; and
a support unit;
wherein the support unit has a second fastening section fixed to a first fastening section of the guide unit and a load-bearing section configured to accommodate a spring unit;
wherein a second plane is oriented orthogonally with respect to a width of the second fastening section of the support unit;
wherein the load-bearing section is asymmetrical with respect to the second plane;
wherein the guide unit extends predominantly along a first plane;
wherein, in an assembled state, in which the support unit is fixed by the second fastening section to the first fastening section, the first plane is oriented parallel to the second plane;
wherein the first plane is oriented orthogonally with respect to a pivot axis of a pivotable mounting of the guide unit in a bearing section;
wherein, in a mounted state, at least one fastening structure is arranged in the first plane;
wherein the first plane runs centrally through the bearing section of the guide unit; and
wherein, on the load-bearing section, the at least one fastening structure has an orthogonal offset with respect to the second plane.

2. The control arm as claimed in claim 1, wherein the at least one fastening structure includes at least two fastening structures, including a first fastening structure and a second fastening structure, wherein, on the load-bearing section, the at least two fastening structures each have an orthogonal offset with respect to the second plane, and wherein the offset of the first fastening structure differs from the offset of the second fastening structure.

3. The control arm as claimed in claim 2, wherein the guide unit, at a distal end situated opposite the first fastening section, comprises a bearing section configured to pivotably mount on a frame, wherein the pivot axis of the pivotable mounting lies orthogonally with respect to the first plane, and wherein the first fastening section extends tangentially with respect to a circular path running around the pivot axis.

4. The control arm as claimed in claim 3, wherein the load-bearing section includes at least one fastening structure which, in the assembled state of the steering unit, is spaced apart from the first plane.

5. The control arm as claimed in claim 4, wherein the support unit is configured as one of a left-hand support unit and a right-hand support unit.

6. The control arm as claimed in claim 5, wherein the support unit has two opposite fastening surfaces, and wherein the load-bearing section is plane-symmetrical with respect to a plane lying between the fastening surfaces.

7. The control arm as claimed in claim 1, wherein the guide unit, at a distal end situated opposite the first fastening section, comprises a bearing section configured to pivotably mount on a frame, wherein the pivot axis of the pivotable mounting lies orthogonally with respect to the first plane, and wherein the first fastening section extends tangentially with respect to a circular path running around the pivot axis.

8. The control arm as claimed in claim 1, wherein the load-bearing section includes at least one fastening structure which, in the assembled state of the steering unit, is spaced apart from the first plane.

9. The control arm as claimed in claim 1, wherein the support unit is configured as one of a left-hand support unit and a right-hand support unit.

10. The control arm as claimed in claim 1, wherein the support unit has two opposite fastening surfaces, and wherein the load-bearing section is plane-symmetrical with respect to a plane lying between the fastening surfaces.

11. A chassis system for utility vehicles, comprising:
a frame; and
two steering units as claimed in claim 1 pivotably fixed to the frame;
wherein the frame has a transverse direction;
wherein each steering unit has a support unit with at least one fastening structure;
wherein, by at least one of rotating a fastening position of a support unit on the respective guide and interchanging the support units for one another, at least one fastening structure can be placed into a location which is offset in parallel with respect to the transverse direction.

12. The chassis system as claimed in claim 11, wherein the two steering units include a left-hand support unit fixed to one of the two guide units, and a right-hand support unit fixed to the other of the two guide units, and wherein, in relation to a plane lying centrally between the two first planes, different fastening locations of spring units on the support units are provided.

13. The chassis system as claimed in claim 12, wherein the left-hand support unit is fixed to one of the two guide units, and the right-hand support unit is fixed to the other guide unit, and wherein the fastening structure of the left-hand support unit has a first spacing to the fastening structure of the right-hand support unit.

14. The chassis system as claimed in claim 13, wherein, in the case of an interchanged arrangement of the support units, the spacing of the fastening structure to one another is a different value.

15. The chassis system as claimed in claim 11, wherein the support units are fixed in one of two fastening positions on the respective guide unit, in such a way that the fastening structure of the support units have one of two possible spacings to one another.

16. The chassis system as claimed in claim 15, wherein the support units include three fastening structures, wherein at least two fastening structures are spaced apart from the second plane.

17. The chassis system as claimed in claim 11, wherein the support units include three fastening structures, wherein at least two fastening structures are spaced apart from the second plane.

* * * * *

UNITED STATES PATENT AND TRADEMARK OFFICE
CERTIFICATE OF CORRECTION

PATENT NO. : 9,707,999 B2
APPLICATION NO. : 14/902780
DATED : July 18, 2017
INVENTOR(S) : Spielmann It is certified that error appears in the above-identified patent and that said Letters Patent is hereby corrected as shown below:

In the Specification

Column 8, Line 42:
"an" should be — in —

Column 9, Line 31:
After "left-hand" insert -- support --

Column 9, Line 32:
"right-had" should be — right-hand —

Column 11, Line 9 (2nd occurrence):
"42" should be — 22 —

Column 11, Line 55:
After "4" insert -- by --

Column 12, Line 7:
"a" should be — α —

Column 13, Line 21:
"a" should be — α —

In the Claims

Column 16, Claim 12, Line 46:
There should be no paragraph here.

Column 16, Claim 15, Line 66:
"have" should be — has —

Signed and Sealed this
Twentieth Day of March, 2018

Andrei Iancu
*Director of the United States Patent and Trademark Office*